United States Patent [19]

Heilman et al.

[11] Patent Number: 4,466,641
[45] Date of Patent: Aug. 21, 1984

[54] DUCT CONNECTING SYSTEM

[75] Inventors: Robert R. Heilman, Elburn, Ill.; Howard J. McElroy, Cedar Rapids, Iowa

[73] Assignees: The Lockformer Company, Lisle, Ill.; Iowa Precision Industries, Inc., Cedar Rapids, Iowa

[21] Appl. No.: 405,061

[22] Filed: Aug. 4, 1982

[51] Int. Cl.³ ..................... F16L 23/00; F16L 25/00
[52] U.S. Cl. ................... 285/406; 285/364; 285/424
[58] Field of Search ............. 285/363, 405, 424, 364, 285/406

[56] References Cited

U.S. PATENT DOCUMENTS

| | | | |
|---|---|---|---|
| 565,499 | 8/1896 | Pattison | 285/424 X |
| 3,199,901 | 10/1965 | Jeppsson | 285/424 X |
| 3,428,342 | 2/1969 | Chambers | 285/406 X |
| 3,443,601 | 5/1969 | Siegwart | 138/156 |
| 3,630,549 | 12/1971 | Grimm | 285/364 X |
| 3,712,650 | 1/1973 | Mez | 285/405 |
| 3,754,782 | 8/1973 | DeLord | 285/424 |
| 3,923,326 | 12/1975 | Mez | 285/363 |
| 4,045,989 | 9/1977 | Ryan | 72/133 |
| 4,218,079 | 8/1980 | Arnoldt | 285/363 X |
| 4,288,115 | 9/1981 | Sullivan | 285/363 |

FOREIGN PATENT DOCUMENTS

| | | | |
|---|---|---|---|
| 14123 | 8/1980 | European Pat. Off. | 285/424 |
| 2414815 | 10/1975 | Fed. Rep. of Germany | 285/424 |
| 2501611 | 7/1976 | Fed. Rep. of Germany | 285/424 |

OTHER PUBLICATIONS

"WEFA—Duct Fabrication System"—Distributed by Spiro USA, Inc., 5 pages.

Primary Examiner—Richard J. Scanlan, Jr.
Attorney, Agent, or Firm—McDougall, Hersh & Scott

[57] ABSTRACT

A system for connectng the ends of sheet metal ducts wherein each duct end is provided with a frame. Corner connectors defining perpendicularly extending arms are associated with each frame, and bolts or other fasteners are utilized for connecting the connectors and frames. The respective frames comprise integral roll-formed sections at the duct ends. The sections include a first portion extending perpendicularly outwardly from the duct wall and a second portion bent rearwardly from the outer end of the first portion. When the frame is formed in this fashion, it is adapted to receive the side edges of respective arms of corner connectors whereby the ducts may be efficiently assembled by locating corner connectors in place and thereafter applying the fasteners used for maintaining the assembly.

25 Claims, 15 Drawing Figures

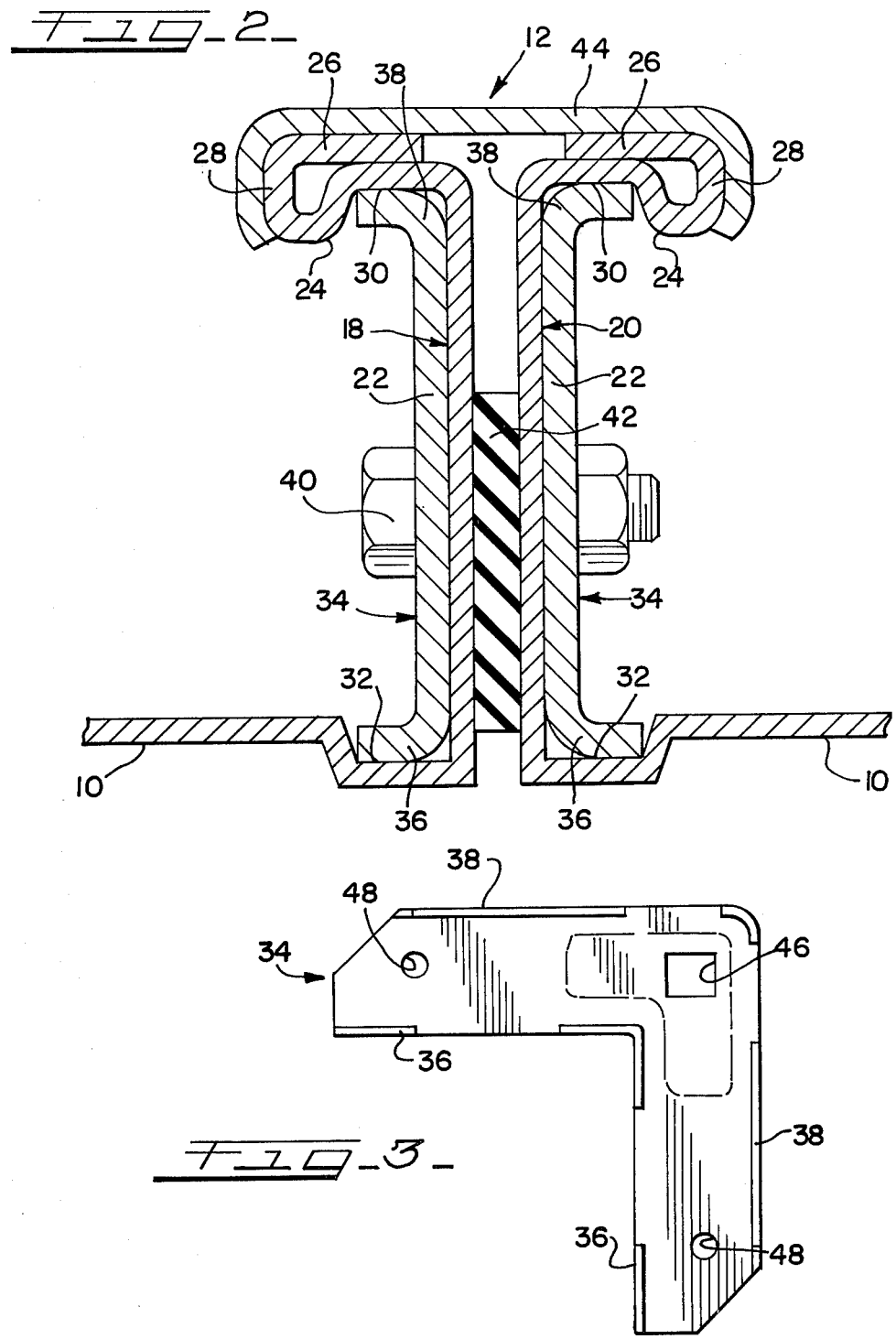

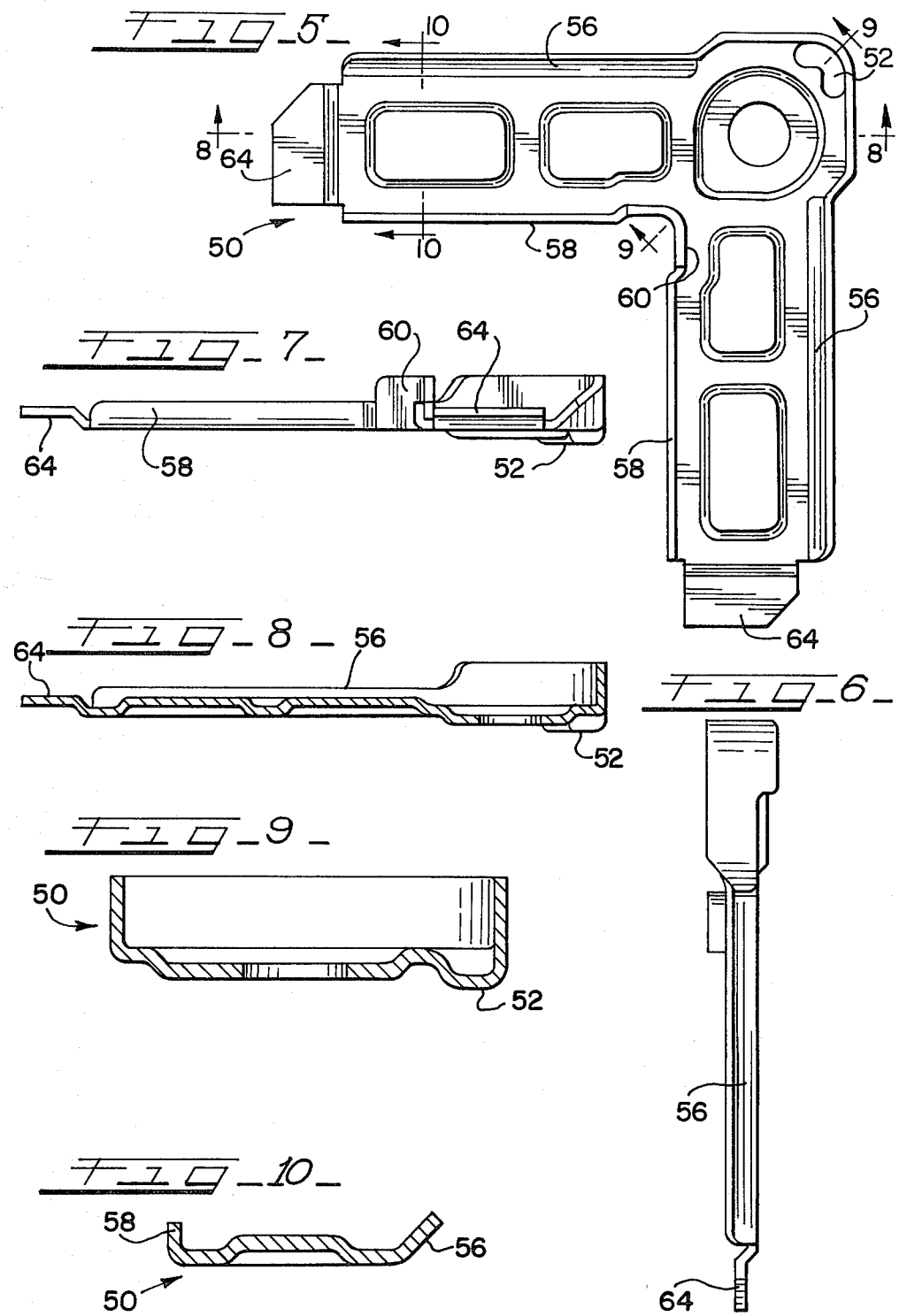

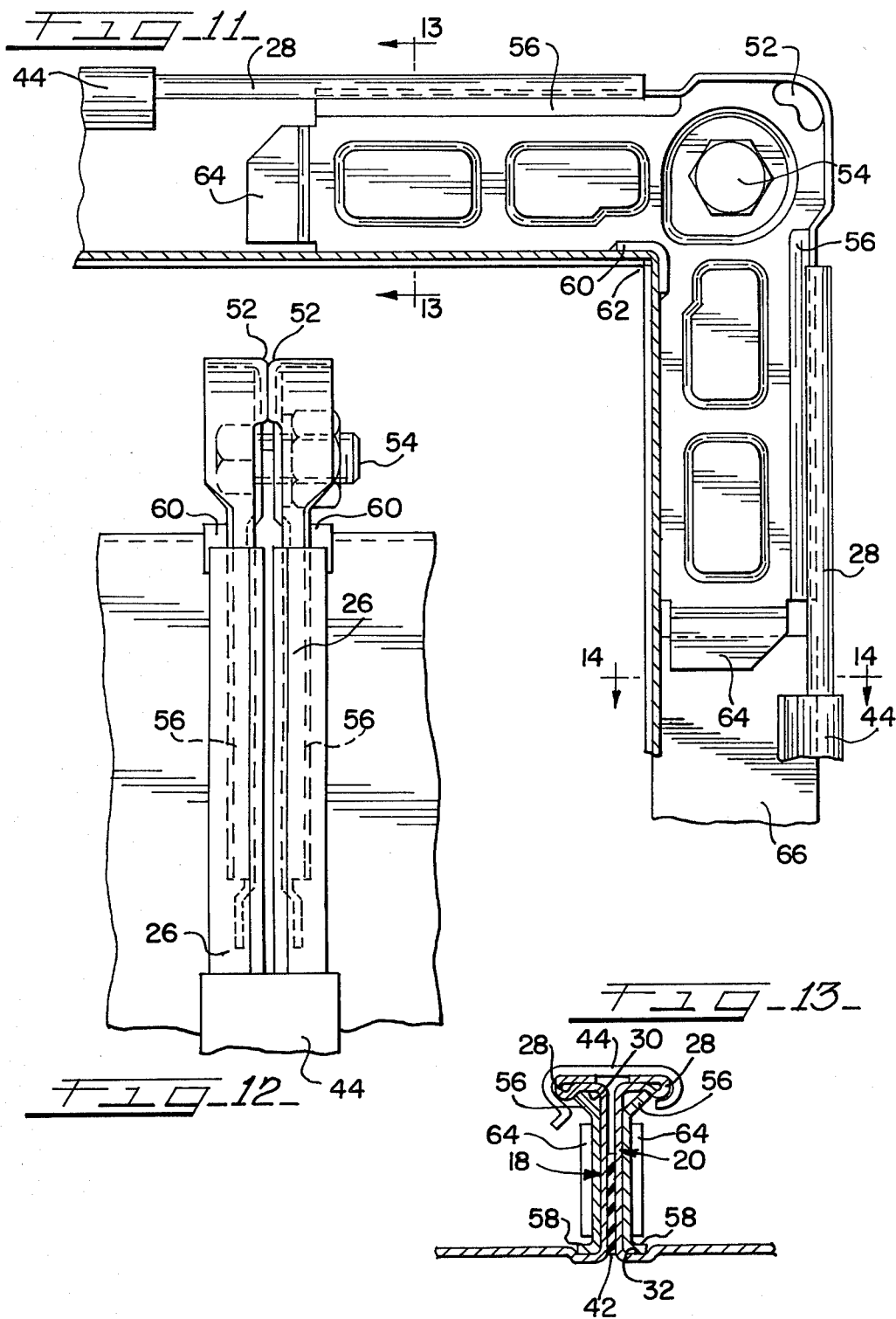

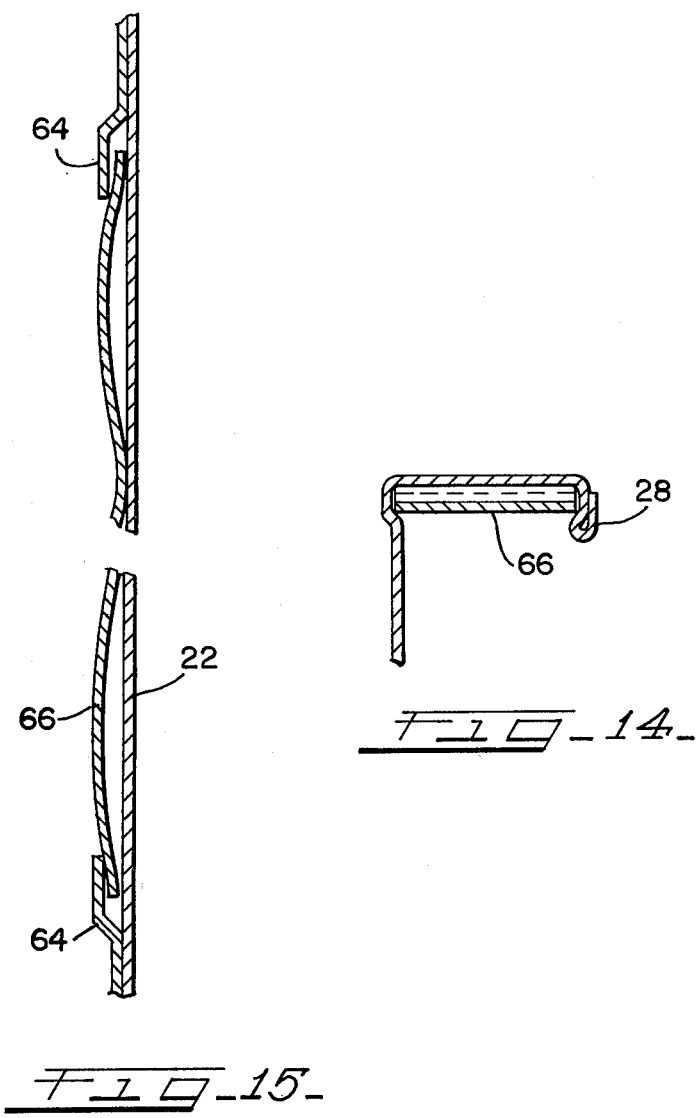

DUCT CONNECTING SYSTEM

BACKGROUND OF THE INVENTION

This invention relates to means for connecting the ends of a pair of sheet metal duct sections. The invention particularly involves an assembly of the type including frame members defining flanges located at a duct end with adjacent frame members joined to each other by angular corner pieces.

The prior art, particularly Mez U.S. Pat. No. 3,712,650 and Arnoldt U.S. Pat. No. 4,218,079 disclose flange connections for connecting the ends of rectangular air conditioning ducts. These arrangements include flange portions having a horizontal leg portion secured to the end portion of the duct and a vertical channel-shaped leg for receiving the arms of an angular corner piece.

In the Mez patent, the angular corner pieces have arm portions that extend into an opening in the vertical leg. The arm portions are so dimensioned vertically that the lower surface of the arms abut the lower wall of the horizontal flange. With this arrangement, the end of the duct wall abuts or rests against a surface of the corner piece arm extending into the channel-shaped opening.

The Arnoldt patent also provides flange portions having an upstanding channel-shaped leg portion with a front wall and a rear wall forming a longitudinal opening therebetween, and a duct receiving leg portion with a top wall and a bottom wall. A corner piece is insertable in the longitudinal opening, and provision is also made for gasket means positioned in the longitudinal opening adjacent the duct receiving leg bottom wall. The gasket means is adapted to be positioned between the duct end portion and the upper surface of the duct receiving leg bottom wall to sealingly connect the duct end portion to the frame flange portion.

In the Mez and Arnoldt arrangements, bolts or the like are utilized for attaching the corner pieces at one duct end with corner pieces of an adjacent duct end. A suitable clip may then be snapped in place at the extremities of the adjoining frames at the respective duct ends. The assemblies thus obtained are of satisfactory strength; however, multiple assembly steps requiring skill and experience are involved in achieving this assembly.

Siegwart U.S. Pat. No. 3,443,601 discloses another arrangement for joining duct ends. In accordance with this teaching, frame-like portions are formed as integral parts of a duct end, and clips or ledges are provided for engagement with adjacent frame-like portions. The frame-like portions and/or the clips are designed so that a resilient connection is achieved with a view toward insuring a satisfactory attachment. Although this arrangement involves fewer assembly steps, the assembly operation is difficult, and the arrangement is not completely satisfactory from a strength standpoint.

SUMMARY OF THE INVENTION

In accordance with the system of this invention, frames and corner connectors are assembled at a duct end for connection with corresponding frames and corner connectors of an adjacent duct end. The assembly is achieved by means of bolts or similar fasteners in a conventional fashion.

An improvement of the invention resides in the formation of the frame as an integral roll-formed section of a duct wall. The frame defines a first portion extending perpendicularly outwardly from the duct wall and a second portion bent rearwardly into position opposite an end portion of the duct wall. In the preferred form of the invention, the rearwardly bent second portion and the oppositely facing end portion of the duct wall define opposing channels. The side edges of an arm of a corner connector are adapted to be snapped into place in these channels for secure assembly of the corner connectors relative to a frame. After this assembly is completed, a duct end can be readily joined with an adjacent duct end by means of the aforementioned bolts.

The invention also involves improvements in corner connectors. A corner connector design has been achieved which enhances the desired locking action, while at the same time, providing a convenient arrangement for assembly. The corner connectors also provide means for minimizing gaps or openings in the joint area. Finally, the connectors preferably include convenient attaching means for stiffeners when such additional elements are desirable.

The roll forming of the duct ends to provide the integral frame, the snapping of the corner connectors into place, and the subsequent bolting operation, all comprise steps that can be preformed rapidly and without the need for great skill.

Equally important is the fact that the resulting duct assembly is characterized by great strength so that a highly reliable assembly operation can be achieved with minimum expense and effort. If desired, a clip can be located around the adjacent frames of adjoining ducts. Gasket material may also be located between adjacent frames without difficulty.

BRIEF DESCRIPTION OF THE DRAWINGS

FIG. 2 is an enlarged fragmentary, cross-sectional view of a duct joint taken about the line 2—2 of FIG. 1;

FIG. 3 is a plan view of a corner connector of the type preferably used in conjunction with the duct joint of this invention;

FIG. 5 is a plan view of a corner connector structure including improved features;

FIG. 6 is an elevational view of the connector shown in FIG. 5 taken from one side of the connector;

FIG. 7 is a elevational view of the connector of FIG. 5 taken from another side of the connector;

FIG. 8 is a horizontal, sectional view taken about the line 8—8 of FIG. 5;

FIG. 9 is a cross-sectional view taken about the line 9—9 of FIG. 5; and,

FIG. 10 is a cross-sectional view taken about the line 10—10 of FIG. 5;

FIG. 11 is a fragmentary, sectional view illustrating the corner connector of FIG. 5 as part of a duct joint;

FIG. 12 is a fragmentary side elevational view of the duct joint of FIG. 11;

FIG. 13 is a cross-sectional view taken about the line 13—13 of FIG. 11;

FIG. 14 is a cross-sectional view illustrating a stiffener design taken about the line 14—14 of FIG. 11; and, FIG. 15 is a fragmentary, cross-sectional view illustrating the stiffener design.

DETAILED DESCRIPTION OF THE INVENTION

Figure 1:
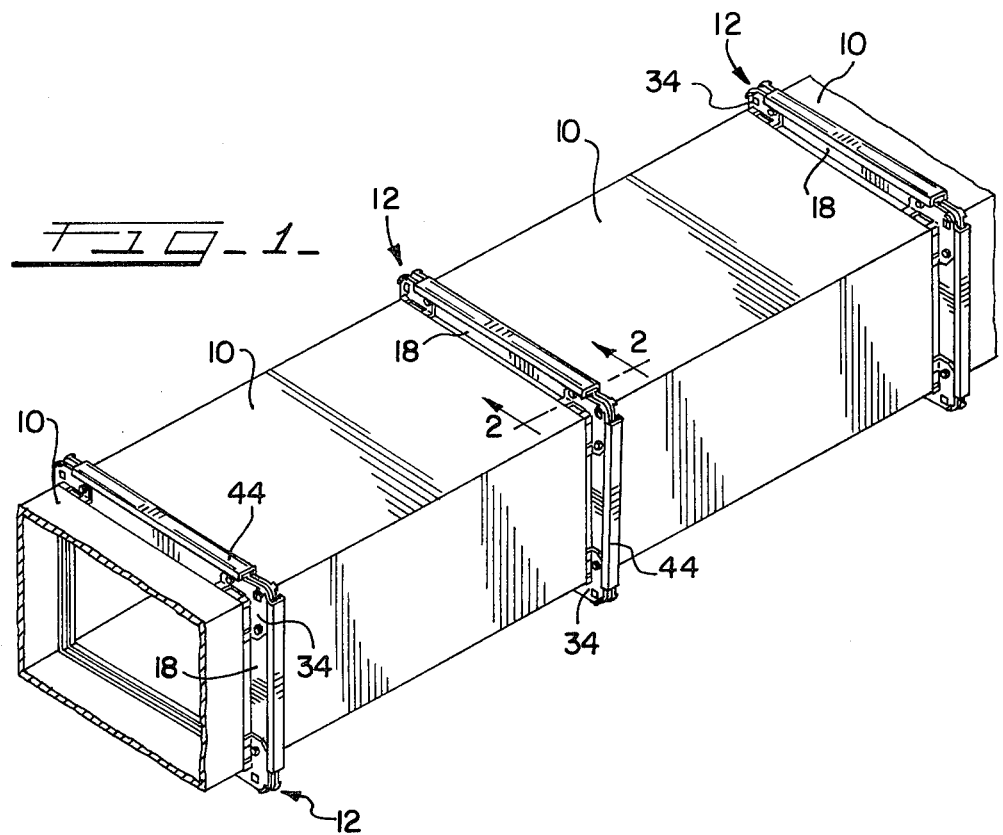
FIG. 1 is a fragmentary perspective view of a duct assembly characterized by the features of this invention.

FIG. 1 illustrates a series of ducts 10 of the type typically used for heating and ventilating purposes. The ducts are assembled by means of duct end joining means 12. Typically, such joining means are used with relatively large ducts of the type employed for commercial and industrial applications. Where the span between ducts is relatively long, stiffeners may be employed intermediate the duct joining means.

Figure 4:
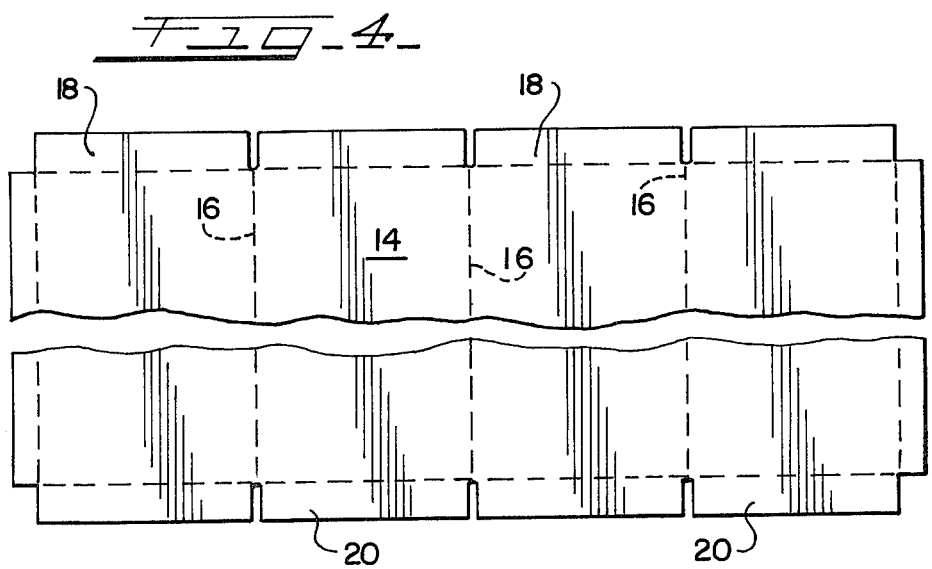
FIG. 4 is a fragmentary plan view of a duct blank especially designed for the practice of the invention.

FIG. 4 illustrates a duct blank 14 of the type contemplated for use in the practice of the invention. This blank is adapted to be folded along the lines 16 to achieve the rectangular configuration of FIG. 1. The respective ends 18 and 20 of the blank are adapted to be formed in a manner to be described whereby the end of a duct formed from one blank can be joined with the end of another duct.

FIG. 2 illustrates in cross section the roll-formed shape of the end 18 of one duct, and the roll-formed shape of the end 20 of an adjacent duct. The roll-forming operation for achieving this configuration may be conducted on known equipment, for example equipment of the type described in Ryan U.S. Pat. No. 4,045,989.

Each of the formed ends 18 and 20 comprise an upturned portion 22 extending perpendicularly from the duct wall. A second portion 24 is bent rearwardly whereby this portion 24 extends opposite a portion of the duct wall. A return portion 26 is also provided, and a bead 28 is formed at the same time.

The combination of the outwardly extending portion 22 and the rearwardly extending portion 24 comprises a frame formed integrally with the duct wall. In a preferred form of the invention, a channel 30 is formed between the bead 28 and the portion 22, and a similar channel 32 is formed in the duct wall opposite the channel 30. A corner connector 34 defines edges 36 and 38 which can be received by the respective channels.

The corner connector 34 is shown in greater detail in FIG. 3. The corner connector preferably comprises a cast or forged member which may be machined to achieve the edges 36 and 38. This member is preferably of a relatively stiff metal whereas the sheet metal forming the duct and integral frame is preferably of relatively resilient material. With this combination, the corner connector is adapted to be snapped into place by locating the edge 38 of the corner connector in channel 30 and by then driving the edge 36 toward portion 22 for setting of the edge 36 in channel 32.

As shown in FIG. 3, the corner connector 34 consists of perpendicularly extending arms. In the assembly illustrated in FIG. 1, it will be appreciated that one corner connector will span the separation between adjacent frames of a duct. An individual assembling the ducts will simply snap four corner connectors in place for a given duct end, and this operation can be achieved manually without the need for any tools. Where equipment of the type described in the aforementioned Ryan patent is utilized, the integral frames may be automatically formed, and the duct readily bent to the desired rectangular configuration. Accordingly, neither highly sophisticated labor nor great effort is required for achieving the desired assembly of the corner connectors and frames.

When assembling one duct with another, the respective frames and associated corner connectors are brought together, and a bolt 40 or other suitable fastener may be employed for achieving the desired connection. A bolt hole 46 is provided in each corner connector, and additional holes 48 are located adjacent the ends of the connector arms so that additional fasteners may be employed which in this case will extend through the walls of the frames. Prior to completion of this connection, a gasket 42 may be located between the respective frame portions for conventional purposes.

A clip 44 is shown in engagement with the frame portions of adjacent ducts. This clip may be designed to snap into place and will serve to provide a smooth-exposed joint. The clip may also function to strengthen the joint.

FIGS. 5 through 13 illustrate a corner connector 50 of a particularly preferred design. This connector also includes perpendicularly extending arms, and the connector is adapted to be included as part of a duct joint. As shown in FIGS. 11 through 13, the connector is particularly adapted for use in association with ducts of the type previously described which include roll-formed ends 18 and 20.

Each of the corner connectors 50 defines an embossed area 52 on an inside facing surface. The inwardly extending embossed area of one connector will engage the corresponding area of an adjacent connector when a duct joint is formed (see FIG. 12). When the bolt 54 is tightened, the engagement of the embossed areas results in the application of thrust forces by the arms of the connector, and these thrust forces act to press the respective ends 18 and 20 together. The thrust forces are applied by the respective pairs of arms at each corner of the assembled ducts to provide a highly satisfactory locking action.

Each of the connectors 50 also includes outer edges 56 on its arms. These edges extend angularly outwardly from the arms, and the edges are adapted to be received within the channels formed by the duct ends as shown in FIG. 13. In practice, the outer edges 56 of the connectors are first positioned in channels 30 in an inclined attitude, and the connectors are then pivoted so that the inner edges 58 will snap into place within channels 32. The angular configuration of the edges 56 and the respective dimensions of the parts are such that the material bead 28 will yield as the connectors are snapped into place thereby providing very secure holding forces for the connectors relative to the duct ends.

The connectors 50 are also characterized by an inside corner flange 60. This corner flange will serve to cover the opening which is defined at each corner 62 of each duct. These openings or gaps necessarily result when the duct blank is cut to provide the portions to be roll-formed into duct ends 18 and 20. By designing the corner connector in this fashion, the outward flow of air from within the ducts is significantly minimized.

Each of the arms of the connectors 50 is provided with an offset ear 64 which may be employed for retaining stiffener members over-lying the surfaces of duct ends 18 and 20. A stiffener 66 is shown in FIG. 11 as an example of the type of member which could be provided, this stiffener comprising a strip of spring steel or the like which can be engaged at its ends beneath the ears 64. At its sides the stiffener is gripped between channels 30 and 32. Particularly if the stiffener is of sufficient length it will assume a corrugated or serpentine configuration as shown in FIG. 15, that is, bends will be present along its length and this will add to the stiffening capability.

The particular stiffener shown is an example only of form suitable for the roll-formed cross-section, and it will be appreciated that other designs could be utilized. In this particular embodiment shown, the ends of the stiffener are advantageously slid beneath ears 64 before attachment of the clips 44.

In addition to the improvements in duct and connector design which have been described, the invention also involves the combination which generally provides for the roll-forming of an integral frame at a duct end. The roll-forming operation is such that a retaining means is automatically provided for a corner connector whereby the corner connector can be quickly assembled with the frame. The subsequent bolting of one duct end to another and the addition of clips and gaskets can then be conveniently accomplished. The simplified operation results in a duct assembly of highly satisfactory strength whereby the combination is particularly suitable for use for commercial and industrial applications.

It will be understood that various changes and modifications may be made in a system of the type described which provide the characteristics of the invention without departing from the spirit thereof particularly as defined in the following claims.

We claim:

1. In a system for connecting the ends of sheet metal ducts wherein a frame is provided for each duct end, corner connectors defining perpendicularly extending arms are associated with the frames, and means are provided to interconnect the frames of adjacent duct ends, the improvement wherein the sheet metal used for the ducts is also employed for forming said frames, each said frame specifically comprising a roll-formed section consisting of an integral part of a duct wall, each said section comprising a first portion extending perpendicularly outwardly from a duct wall, and a second portion bent rearwardly into a position opposite an end portion of the duct wall, the distance between said second portion and said end portion substantially corresponding to the width of an arm of a corner connector, the side edges of each such arm being received in engagement with the respective surfaces of a second portion and end portion whereby the corner connectors are held in position relative to a frame, and including retainer means defined by said second portion for receiving a side edge of an arm for thereby securely holding the arm in position.

2. An apparatus in accordance with claim 1 wherein said retainer means include a channel formed in said second portion.

3. An apparatus in accordance with claim 2 including a second channel formed in said end portion of the duct wall for receiving the opposite side edge of an arm.

4. An apparatus in accordance with claim 1 including a return portion defined by said second portion, and a bead formed by said return portion for assisting in engagement of an arm with said second portion.

5. An apparatus in accordance with claim 4 including a clip connected to adjacent second portions of assembled duct ends, said clip spanning the distance between said adjacent second portions.

6. An apparatus in accordance with claim 5 wherein said beads of the second portions provide means for engagement by said clip.

7. In a method for connecting the ends of sheet metal ducts wherein a frame is provided for each duct end, corner connectors defining perpendicularly extending arms are associated with the frames, and means are provided to interconnect the frames of adjacent duct ends, the improvement comprising the steps of forming each said frame by roll-forming a section of the duct whereby the frame comprises an integral part of the sheet metal duct, each said roll-formed section comprising a first portion extending perpendicularly outwardly from a duct wall, and a second portion bent rearwardly into a position opposite an end portion of the duct wall, the distance between said second portion and said end portion substantially corresponding to the width of an arm of a corner connector, forming a retainer means in said second portion, introducing the arms of the corner connectors between respective second portions and end portions whereby the side edges of each such arm are received in engagement with the respective surfaces of a said second portion and end portion to hold the corner connectors in position relative to a frame, said retainer means assisting in the holding by said second portion, and thereafter fastening the respective connectors together to provide an assembly.

8. A method in accordance with claim 7 wherein said retainer means include a channel formed in said second portion.

9. A method in accordance with claim 8 including the step of forming a second channel in said end portion of the duct wall for receiving the opposite side edge of an arm.

10. A method in accordance with claim 7 including the step of forming a return portion in said second portion, and forming a bead in said return portion for assisting in engagement of an arm with said second portion.

11. A method in accordance with claim 10 including the step of connecting a clip to adjacent second portions of the assembled duct ends, said clips spanning the distance between said adjacent second portions.

12. A method in accordance with claim 11 wherein said beads of the second portions provide means for engagement by said clip.

13. In a system for connecting the ends of sheet metal ducts wherein a frame is provided for each duct end, a plurality of corner connectors defining perpendicularly extending arms are associated with the frames, and means are provided to interconnect the frames of adjacent duct ends to form an assembly, the improvement wherein each corner connector in the assembly includes an offset ear formed on the end of each of said arms, and including a stiffener member extending between the ears on the ends of adjacent connectors mounted on said frames, said stiffener member being held in the space defined by the said ears and the adjacent frame surfaces.

14. In a system for connecting the ends of sheet metal ducts wherein a frame is provided for each duct end, corner connectors defining perpendicularly extending arms are associated with the frames, and means are provided to interconnect the frames of adjacent duct ends, the improvement wherein each said frame comprises a first portion extending perpendicularly outwardly from a duct wall, and a second portion bent rearwardly into a position opposite an end portion of the duct wall, a first channel formed in said second portion for receiving a side edge of an arm, and a second channel formed in said end portion of the duct wall for receiving the opposite side edge of an arm, the distance between said channels of said second portion and said end portion substantially corresponding to the width of an arm of a corner connector, the side edges of each such arm being received in engagement with the respective bottom surfaces of said channels whereby the corner connectors are held in position relative to a frame.

15. An apparatus in accordance with claim 14 including a return portion defined by said second portion, and a bead formed by said return portion for assisting in engagement of an arm with said second portion.

16. An apparatus in accordance with claim 15 including a clip connected to adjacent second portions of assembled duct ends, said clips spanning the distance between said adjacent second portions.

17. An apparatus in accordance with claim 16 wherein said beads of the second portions provide means for engagement by said clip.

18. An apparatus in accordance with claim 14 wherein one of the side edges of each arm defines an angularly outwardly extending portion, said angularly, outwardly extending portion defining a bearing surface for engagement with the outer edge of a channel whereby said bearing surface is adapted to be driven over said outer edge to achieve seating of said side edges within said channel for thereby enabling secure holding of the connectors in place relative to the frame.

19. An apparatus in accordance with claim 18 wherein said frame defines a bead along the outer edge of at least one channel which is engaged with said angularly extending outer side edge, said angularly extending outer side edge being snapped into place within the channel upon being forced beyond said bead.

20. In a method for connecting the ends of sheet metal ducts of the type having a frame located at each duct end, corner connectors defining perpendicularly extending arms associated with the frames, and means for interconnecting the frames of adjacent duct ends, the improvement comprising the steps of roll forming each said frame to provide a first frame portion adapted to extend perpendicularly outwardly from a duct wall when the frame is located in position, a second portion bent rearwardly relative to said first portion, and a third portion opposite said second portion, the distance between said second portion and said third portion substantially corresponding to the width of an arm of a corner connector, forming a retainer in said second portion of said frame, attaching said corner connectors to said frames by locating one side edge of each arm in the space between said second and third portions and driving the opposite side edge of that arm into said space whereby the respective side edges of each such arm are received in engagement with the respective surfaces of said second portion and said third portion, said retainer means assisting in the holding by said second portion whereby the corner connectors are held in position relative to a frame.

21. A method in accordance with claim 20 wherein said retainer means include a channel formed in said second portion.

22. A method in accordance with claim 21 including the step of forming a second channel in said third portion of said frame for receiving the opposite side edge of an arm.

23. A method in accordance with claim 20 including the step of forming a return portion defined by said second portion, and forming a bead in said return portion for assisting in engagement of an arm with said second portion.

24. A method in accordance with claim 20 wherein said duct end is roll-formed into said first and second portions whereby said frame comprises an integral portion of the sheet metal, said third portion comprising an end portion of the duct wall disposed opposite said second portion.

25. A method in accordance with claim 24 including the step of forming seats in said second and third portions during said roll forming, said seats providing means for receiving said side edges of said arms.

* * * * *